United States Patent [19]

Miwa

[11] Patent Number: 4,634,263

[45] Date of Patent: Jan. 6, 1987

[54] ORIGINAL DOCUMENT FEEDING ARRANGEMENT

[75] Inventor: Yoshihisa Miwa, Nara, Japan

[73] Assignee: Sharp Kabushiki Kaisha, Osaka, Japan

[21] Appl. No.: 751,144

[22] Filed: Jul. 2, 1985

[30] Foreign Application Priority Data

Jul. 4, 1984 [JP] Japan .................................. 59-139647

[51] Int. Cl.⁴ ............................................ G03G 15/00
[52] U.S. Cl. .............................. 355/14 SH; 355/3 SH; 271/270
[58] Field of Search ............... 355/14 SH, 3 SH, 14 R; 271/271, 272, 273, 274, 270

[56] References Cited

U.S. PATENT DOCUMENTS 4,370,055  1/1983  Nishikawa et al. ............ 355/14 SH Primary Examiner—R. L. Moses
Attorney, Agent, or Firm—Birch, Stewart, Kolasch & Birch

[57] ABSTRACT

An original document feeding arrangement for use in a copying machine and the like which includes a device for feeding original documents placed on a tray, a device for transporting the original document thus fed up to a predetermined position on an original document platform so as to be stopped thereat, a device for driving the transporting device, selecting members for selecting speeds of the transporting device according to kinds of the original documents, and a control unit for effecting speed control of the driving device at the speed selected by the selecting members.

7 Claims, 9 Drawing Figures

ORIGINAL DOCUMENT FEEDING ARRANGEMENT

BACKGROUND OF THE INVENTION

The present invention generally relates to a feeding arrangement and more particularly, to an original document feeding arrangement for feeding original documents into an original document scanning position so as to scan the original document, for example, in an electrophotographic copying apparatus.

Generally, in an electrophotographic copying apparatus and the like, it is so arranged that an electrostatic latent image corresponding to an original document is formed on a photosensitive or photoreceptor surface as a recording medium by projecting a light image of the original document optically scanned, onto said photoreceptor surface. In the above case, the original document must be placed at a predetermined position, and for omitting a procedure required therefor, there has conventionally been provided an arrangement for automatically feeding the original document up to the original document placing surface, i.e., the so-called original document scanning surface. The known original document feeding arrangement as described above generally includes means for feeding, one sheet by one sheet, original documents held on an original document stock section, a transporting means for transporting the original documents thus fed up to the original document placing surface and discharging the same after termination of the scanning, and a control means for controlling the transporting means so as to stop the original document at a predetermined position on the original document placing surface.

With respect to the performance of the original document feeding arrangement as described above, particular importance is attached to its original document exchanging speeds, etc. One method for increasing the original document exchanging speeds as referred to above will be to increase the transporting speed of the transporting means. However, merely increasing the transporting speed may result in breakage or damage to the original document depending on the kinds of such original documents. Therefore, it has been a practice to set the transporting means at a speed which will not damage the original document. Therefore, up to the present, the transporting speed of the original document can not be set higher than the speed at which the original document may not be damaged.

SUMMARY OF THE INVENTION

Accordingly, an essential object of the present invention is to provide an improved original document feeding arrangement for use in an electrophotographic copying machine and the like, which is capable of increasing original document exchanging speeds according to the kinds of original documents, i.e., capable of varying original document feeding speeds.

Another important object of the present invention is to provide an original document feeding arrangement of the above described type which is simple in construction and accurate in functioning, and may be easily incorporated into copying apparatuses, etc. at low cost.

In accomplishing these and other objects, according to one preferred embodiment of the present invention, there is provided an original document feeding arrangement for use in a copying machine and the like. This feeding arrangement comprises means for feeding original documents placed on a tray, means for transporting the original document thus fed up to a predetermined position on an original document platform so as to be stopped thereon, means for driving the transporting means, a selecting means for selecting speeds of the transporting means according to kinds of the original documents, and a control means for effecting speed control of the driving means at the speed selected by said selecting means.

By the construction according to the present invention as described above, an improved original document feeding arrangement has been advantageously presented through simple construction.

BRIEF DESCRIPTION OF THE DRAWINGS

These and other objects and features of the present invention will become apparent from the following description taken in conjunction with the preferred embodiment thereof with reference to the accompanying drawings, in which:

FIGS. 6 (a) and 6(b) are time-charts representing examples of pulse signals for driving in the original document feeding arrangement of the present invention; (FIG. 7(a) continues on FIG. 7(b).)

DETAILED DESCRIPTION OF THE INVENTION

Before the description of the present invention proceeds, it is to be noted that like parts are designated by like reference numerals throughout the accompanying drawings.

Referring now to the drawings, there is shown in FIGS. 1 through 4, an original document feeding arrangement according to one preferred embodiment of the present invention as applied to an electrophotographic copying apparatus, which generally includes an original document platform 1 made of a transparent plate, below which an optical means for projecting a light image of an original document 11 placed on the platform 1 onto a photoreceptor surface (not shown) is provided, an original document stopper 2 pivotally disposed at the left side edge of the platform to define a reference position for the leading edge of the original document 11 to be fed over the platform 1, and a transport belt 3 movably disposed on the original document platform 1 for feeding the original document 11 onto the platform 1 or discharging the same out of said platform 1.

Figure 1:
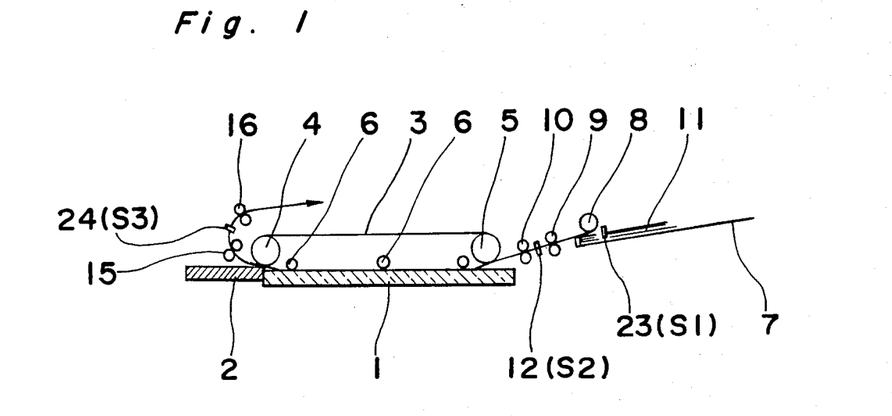
FIG. 1 is a fragmentary side sectional view showing construction of an original document feeding arrangement according to one preferred embodiment of the present invention.
Figure 2:
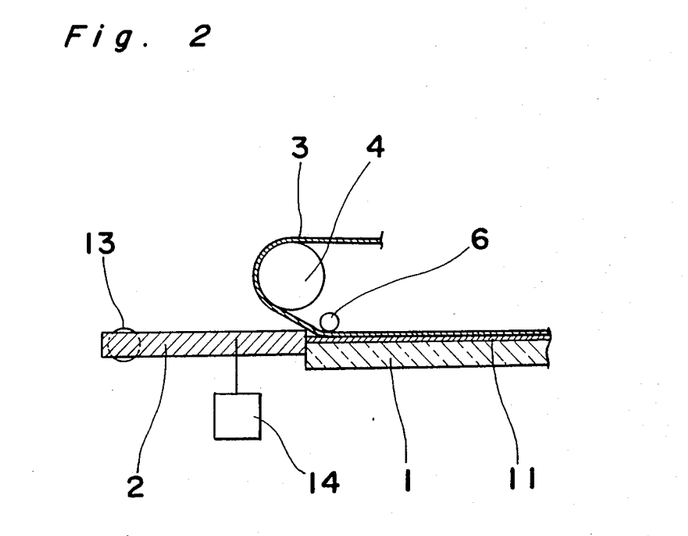
FIG. 2 is a fragmentary side sectional view showing, on an enlarged scale, a stopper portion for the original document at the left side in FIG. 1.

The transport belt 3 in the form of an endless belt is directed around a driving roller 4 and a driven roller 5 rotatably disposed to correspond in positions to opposite ends of the original document platform 1, and is moved or displaced as the driving roller 4 is rotated. Within the loop of the transport belt 3 between the rollers 4 and 5, a plurality of rollers 6 are rotatably provided so as to hold the transport belt 3 in contact with the surface of the platform 1 for positively transporting the original document 11 along the platform 1.

At an inlet side for the feeding direction of the transport belt 3, there are sequentially disposed an original document tray 7 on which a large number of original documents are placed in a stack, a feeding roller 8 for feeding the original documents on the original tray 7 one sheet by one sheet, and transport rollers 9 and 10 for feeding the original document thus supplied, in between the transport belt 3 and the original document platform 1. The feeding roller 8 is rotated by a driving signal, and separates the uppermost original document 11 from the lower original documents in the stack for feeding. The original document 11 thus supplied is fed toward the transport belt 3 through the transport rollers 9 and 10. In this case, an original document leading edge detecting switch 12 (S2) is disposed between the transport rollers 9 and 10, and the transport belt 3 is driven through detection of the leading edge of the original document being fed, by this switch 12. Thus, the original document 11 held between the transport belt 3 and the original document platform 1 is further fed along the platform 1 as the transport belt 3 is moved, but is restricted in its further advance upon contact of its leading edge with the original document stopper 2 projecting from the surface of the platform 1 as shown at the left side in FIG. 2 so as to be stopped in a state where the leading edge thereof is aligned with the reference position. In this case, the transport belt 3 is arranged to be stopped after a predetermined period of time from the contact of the original document leading edge with the stopper 2, and therefore, the original document 11 is positively aligned at its leading edge with the stopper 2, thus being stopped at the specified position at all times. More specifically, since the original document transporting distance from the original document leading edge detecting switch 12 to the original document stopper 2 is constant, and the time required for the original document to arrive at the original document stopper 2 is also considered to be constant, the driving time for the transport belt 3 is so set that the original document 11 is fed by about 20 mm in excess beyond the stopper 2. By this arrangement, it is possible to positively stop the original document at the predetermined position at all times without necessity for providing a particular detecting means to stop the original document at the specified position.

Figure 3:
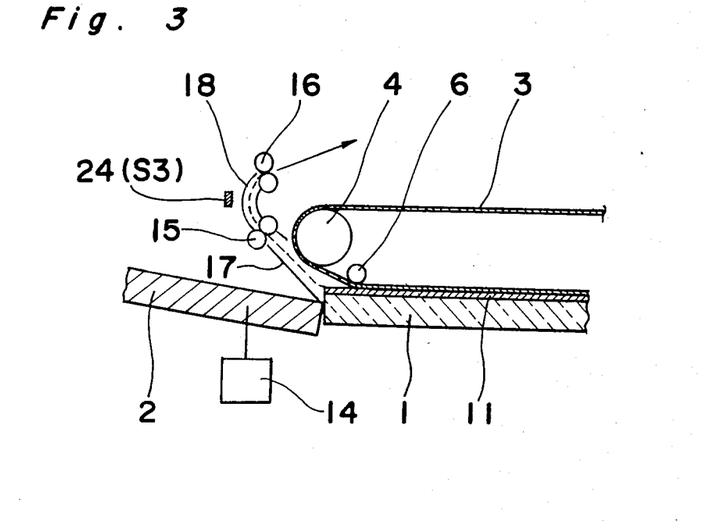
FIG. 3 is a view similar to FIG. 2, which particularly shows a state of discharging the original document.

When the movement of the transport belt 3 is suspended, with the original document 11 being stopped at the specified position by the stopper 2, the optical scanning for forming the image of the original document onto the photoreceptor (not shown) is effected in the known manner. Upon completion of the above optical scanning, the transport belt 3 is again driven by the signal at that time so as to discharge the stopped original document 11. In this case, the stopper 2 for restricting the leading edge of the original document is lowered as shown in FIG. 3, with the original document leading edge being released from the restriction. More specifically, the original document stopper 2 is pivotally supported at its one end by a shaft 13 (FIG. 3) so as to be normally located in the position shown in FIG. 2 by an urging means or positioning means, etc. (not particularly shown). It is further connected with a solenoid 14 which is energized by the completion signal of the optical scanning, thereby to pivot the original document stopper 2 in the clockwise direction against the urging means.

Figure 4:
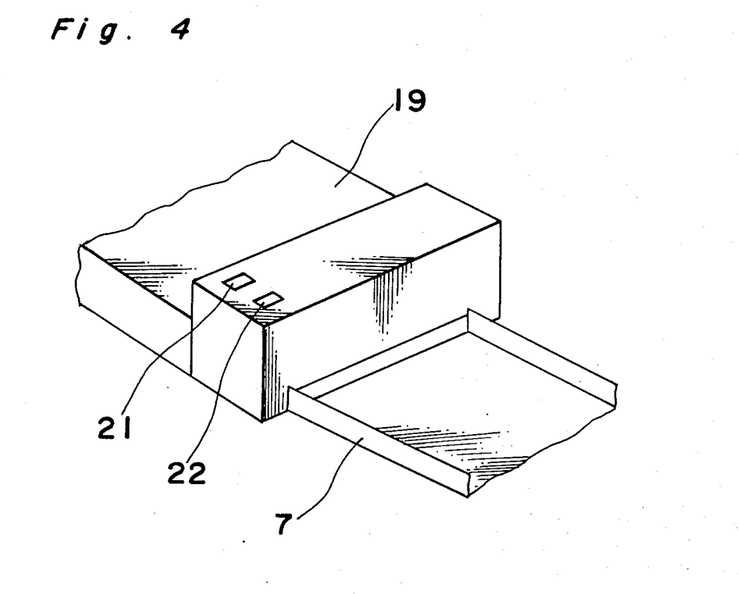
FIG. 4 is a fragmentary perspective view showing a general appearance of the original document feeding arrangement of FIG. 1.

On the other hand, at the discharging side of the original document 11 by the transport belt 3, there are successively disposed discharge rollers 15 and 16 for discharging the original document 11 out of the arrangement, and guide plates 17 and 18 for guiding the original document 11 toward the rollers 15 and 16. The discharged original document 11 is received by a discharge tray 19 provided on an outer surface of the original document feeding arrangement as shown in FIG. 4. On an operating section provided adjacent to the original document tray 7, there are provided selecting switches 21 and 22 for selecting the feeding speeds of the original documents according to the present invention. The selecting switch 21 is to drive the transport belt 3, etc. at a low speed, while the switch 22 is intended to drive the belt 3 at a high speed (FIG. 4).

By the above construction, in the case where thin original documents are to be processed, the selecting switch 21 is preliminarily operated before starting copying, and by actuating a copy start switch (not shown) after setting the original documents 11 on the tray 7, the uppermost one sheet of the original documents 11 on the tray 7 is fed by the feeding roller 8. This feeding roller 8 is arranged to be driven for effecting the feeding of the original document 11 by the actuation of the copy start switch, when the "presence" of the original documents has been detected by a detecting means 23 (S1) provided to detect the presence or absence of the original documents on the tray 7.

The original document 11 thus supplied is detected by the detecting switch 12 (S2) provided between the feeding rollers 9 and 10 while it is transported toward the transport belt 3 via the rollers 9 and 10, whereby the transport belt 3 is driven to transport the original document 11 to the platform 1, and is stopped upon contact of the original document leading edge with the stopper 2. In the above case, the driving time of the transport belt 3 is predetermined, for example, at one second in the case of the low speed driving. In other words, on the assumption that the original document transporting distance from the detecting switch 12 to the stopper 2 is 450 mm, the original document can be stopped, with its leading edge contacting the stopper 2 without fail, if the transport belt 3 is driven at the speed of 500 mm/sec. To the contrary, in the case where the transport belt 3 is to be driven at a high speed, it may be driven at the speed of 1000 mm/sec, for example, for 0.5 second.

When the driving of the above transport belt 3 is suspended, copying function is started based thereon, and the original document 11 stopped by the stopper 2 is optically scanned from its leading edge, whereby the photoreceptor surface is exposed to the light image of said original document. Upon completion of the above scanning for the image exposure, the solenoid 14 is energized by the signal thereof, and the restriction at the leading edge of the original document 11 by the stopper 2 is relieved (FIG. 3). Simultaneously therewith, the transport belt 3 is driven to transport the original document 11 toward the discharge rollers 15 and 16 for discharging said original document out of the feeding arrangement.

During the discharging of the original document 11 as described above, when the trailing edge of the original document is detected by a detecting switch 24 (S3) provided between the discharging rollers 15 and 16 for the trailing edge detection, the feeding roller 8 is driven for feeding of the subsequent original document, if the presence of the original document has been detected by the original document presence/absence detecting means 23 (S1). In the above successive original document feeding on and after the second sheet, the transport belt 3 is being continuously driven, and is stopped after one second in the case of the low speed driving and 0.5 second in the case of the high speed driving from the time point of detection by the original document detecting switch 12. The procedures are the same as above for the functions thereafter, and the original document automatic feeding is continued through repetition of such functions.

It should be noted here that the above feeding roller 8 may be driven by a driving source (i.e., a motor or the like) separately provided from that of the transport belt 3, or if the same driving source is to be employed for both, the rotating force may be transmitted through a clutch means. In the case where separate driving means are employed, the feeding roller 8 is driven at a constant speed at all times, and during stopping of the feeding roller 8, the original document feeding by the transport belt 3 acts as a heavy load thereto. In order to prevent such an inconvenience also, it may be so arranged to mount the feeding roller 8 on a rotary shaft for driving through a one-way clutch (not particularly shown).

Figure 5:
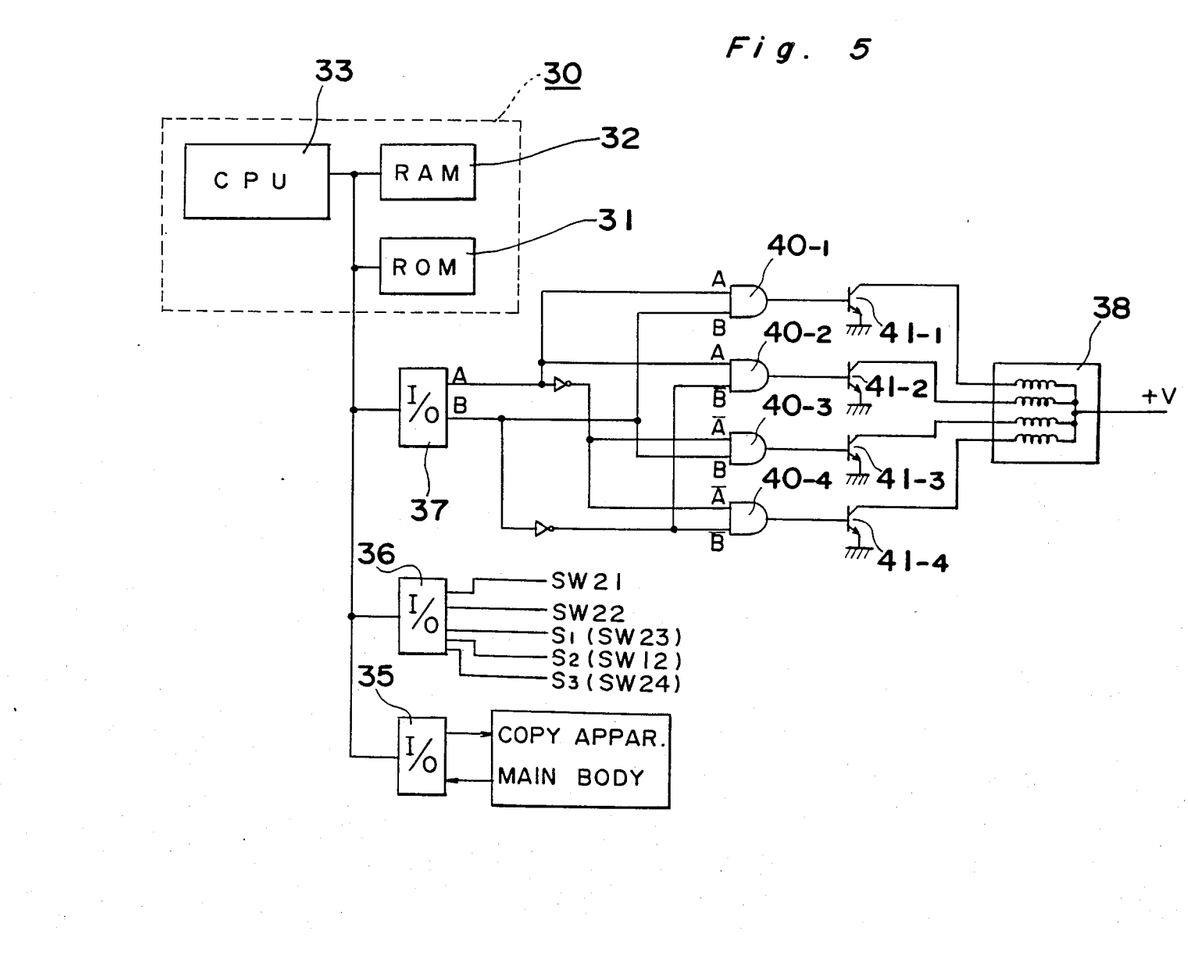
FIG. 5 is a block diagram showing circuit construction of a control circuit for the original document feeding arrangement of FIG. 1.

Referring further to FIG. 5, there is shown a circuit construction of a control circuit for the original document feeding arrangement according to the present invention.

In FIG. 5, the control circuit includes a microcomputer as a control unit 30 (surrounded by dotted lines) provided with a ROM (read only memory) 31 in which programs related to the copying control and original document feeding control are preliminarily stored, a RAM (random access memory) 32 for memorizing or reading out necessary information, and a CPU (central processing unit) 33 which executes the programs of the ROM 31, etc., and produces control signals for output based on input signals from the copying machine and feeding arrangement, etc., all of which are coupled with each other, and connected to I/O ports 35, 36 and 37, as shown.

The signals indicative of the state such as copying functions and the like as supplied from the copying apparatus main body are applied to the control unit 30 through the I/O port 35, and the control unit 30 grasps the state to produce control signals corresponding thereto through the I/O port 35, thereby to drive various devices related to the copying.

Meanwhile, the signals from the original document feeding arrangement are applied to the control unit 30 through the I/O port 36 which are coupled to switches SW21, SW22, SW23, SW12 and SW24, etc. Thus, the driving signals of the original document feeding arrangement are applied to the I/O port 37 for driving control of a driving motor 38 for the transport belt 3, etc., which motor 38 is coupled to the I/O port 37 through respective gates 40-1, 40-2, 40-3 and 40-4, and switching transistors 41-1, 41-2, 41-3 and 41-4, as illustrated. Besides the above driving motor 38, driving of the clutch means or separate motor for rotating the feeding roller 8, etc. is controlled through the I/O port 37. The motor 38 referred to above is a stepping motor which is subjected to a constant speed driving by controlling state of energization of respective exciting coils. More specifically, the signal A, and signal B having a frequency two times that of the signal A, are supplied to the respective gates 40-1 to 40-4 and by sequentially switching the transistors 41-1 to 41-4 through the gates, the respective coils are excited to drive the motor 38 at the constant speed.

Figure 7A:
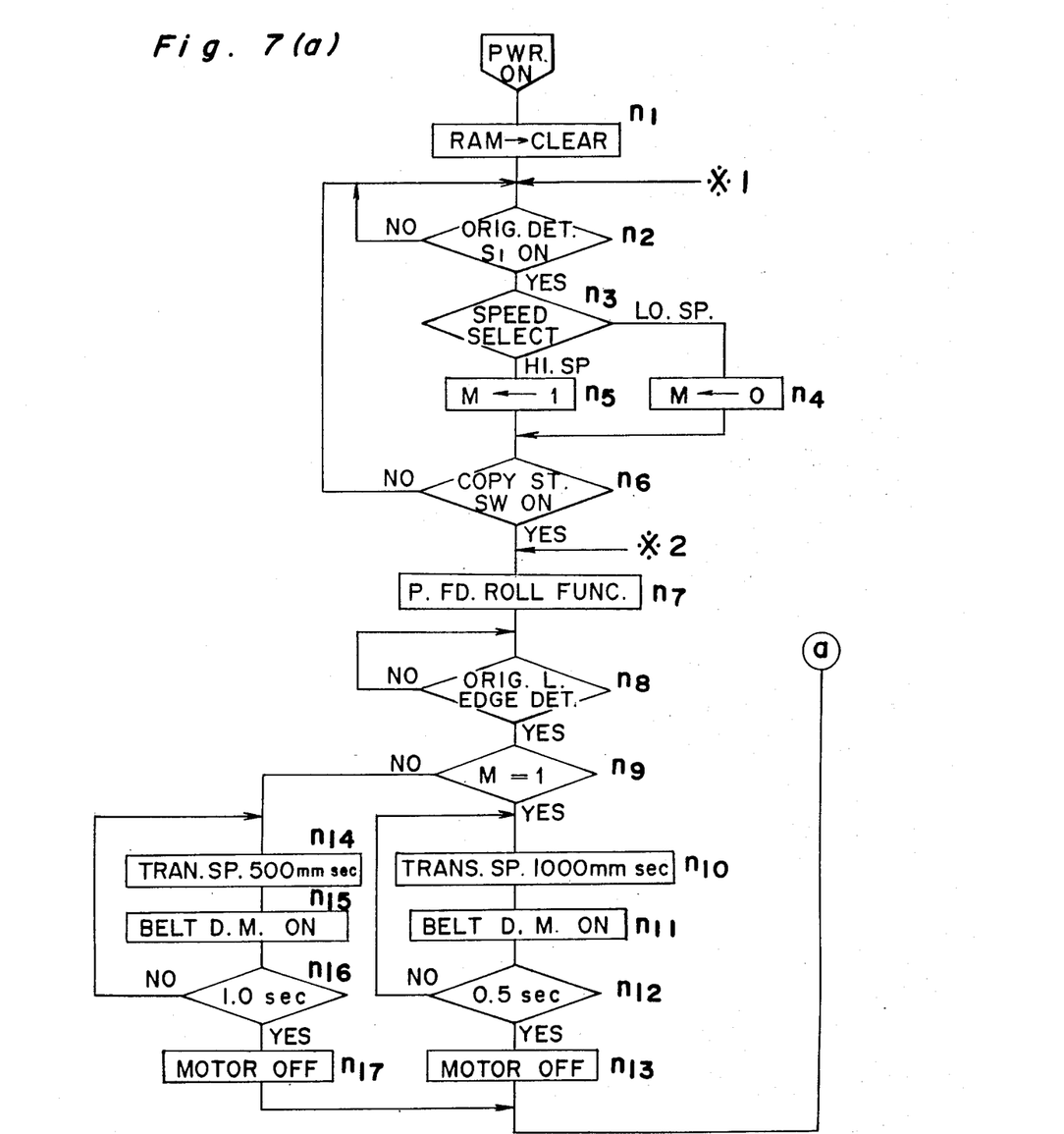
FIGS. 7(a) and 7(b) are a flow-chart explanatory of control procedures in the control circuit of FIG. 5.
Figure 7B:
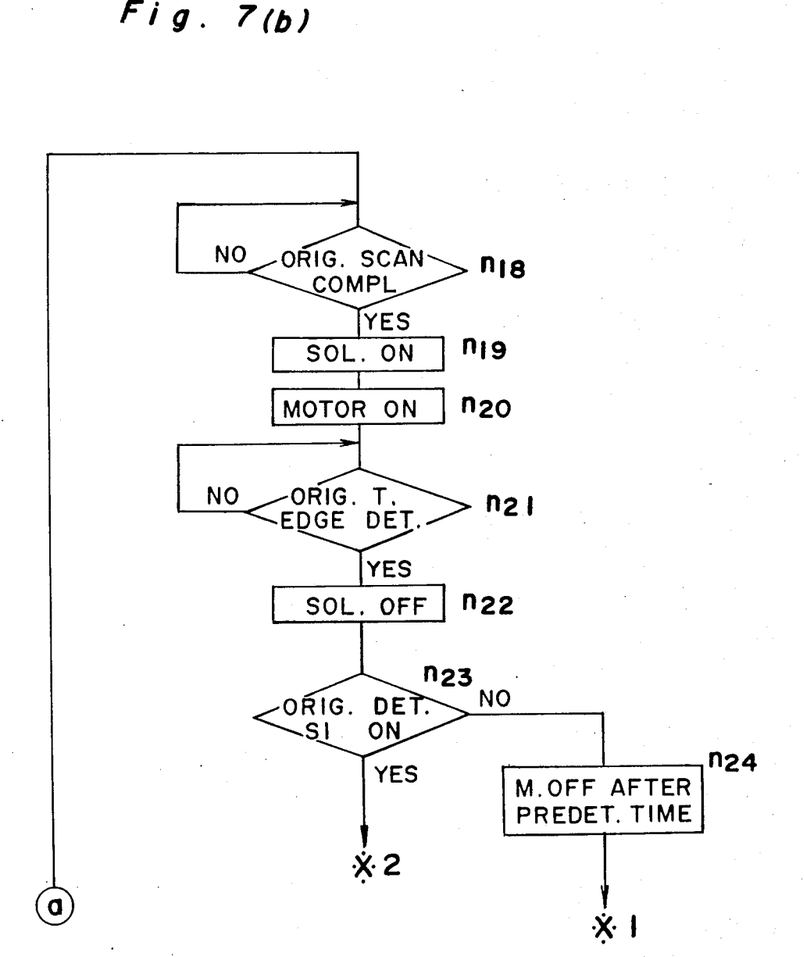

By the construction of the control circuit as described above, control procedures for the original document feeding arrangement of the present invention will be described hereinbelow according to a flow-chart as shown in FIGS. 7(a) and 7(b).

In FIGS. 7(a) and 7(b), in the first place, upon turning on of a power source of the copying apparatus and the like, the contents in the control unit 30 and the copying apparatus, etc. are subjected to the initial setting, while the contents of the RAM 32 are all cleared (step n1). Subsequently, at step n2, it is detected whether or not the original documents 11 are set on the original document tray 7. For this purpose, the presence or absence of the original documents is judged by applying the signal from the detecting means 23 for detecting the original documents on the tray 7, to the control unit 30 through the input port 36. If the original documents have been set, the procedure is shifted to step n3, at which the state of operation of the speed selecting switches 21 and 22 for the transport belt 3 is detected. In this case, when the speed selecting switch 21 is operated, "0" is memorized in a designated area of the RAM 32 at step n4. Meanwhile, if the speed selecting switch 22 is actuated, the procedure proceeds to step n5 to store "1" in the designated area of the RAM 32. Here, even when the selecting switch 21 or 22 is not operated, if the previous operated state has been memorized in the designated area of the RAM 32, the procedure proceeds to step n6 through step n4 or n5. In other words, if "0" is memorized in the RAM 32, the routine for steps n3→n4→n6 is passed, while, if "1" is stored in the designated area of the RAM 32, the routine for steps n3→n5→n6 is followed, and the procedure is shifted to step n6, with "1" being memorized as it is. Meanwhile, when the selecting switch 21 is operated in the state where "1" is stored in the RAM 32, "0" is memorized in the area of the RAM 32 in which "1" is stored at step n4, and the state for the high speed driving is changed over to the state of the low speed driving.

Figure 6A:
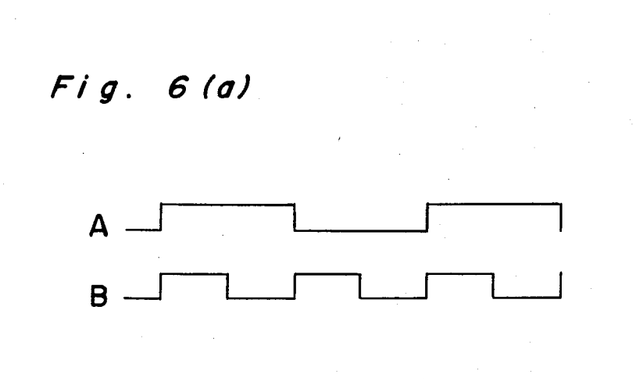
Figure 6B:
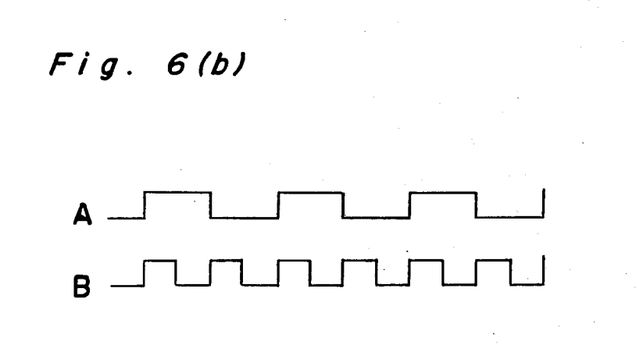

After the above control, at step n6, it is checked whether or not the copy start switch at the side of the copying apparatus is operated. If the copy start switch has not been operated, the procedure returns to step n2 for repeating the above control. Upon operation of the above copy start switch, the roller 8 for the original document feeding is driven at step n7, and the first original document 11 on the tray 7 is fed. This feeding roller 8 is rotated, for example, by driving a driving motor separately provided. Particularly, the feeding roller 8 is arranged to be stopped after one rotation by providing a one rotation mechanism, etc. Moreover, the transport rollers 9 and 10 are also driven simultaneously with the driving of the feeding roller 8 so as to transport the fed original document toward the transport belt 3. During the transportation of the original document 11 as described above, when the leading edge of the original document is detected by the original document leading edge detecting switch 12 (S2), it is checked whether or not the content of the designated area in the RAM 32 is "1". In other words, it is checked whether the transport belt 3 is driven at a high speed or at a low speed. For example, if the original document is thick, the selecting switch 22 is preliminarily operated, and the driving signal for driving the transport belt 3 at a high speed is supplied to the motor 38. Examples of the driving pulses produced from the I/O port 37 in the above case are shown in FIGS. 6(a) and 6(b), in which FIG. 6(a) shows the examples of the driving pulses during the low speed driving with a period ½ that in FIG. 6(a). Accordingly, in the case of the high speed driving, the motor 38 is driven at a speed two times that in the low speed driving. As described earlier, if the driving speed of the transport belt 3 is 500 mm/sec at the low speed, it becomes 1000 mm/sec at the high speed. Here, after a predetermined period of time from the detection of the leading edge of the original document, i.e., when the original document is transported by the transport belt 3, the driving of the transport rollers 9 and 10 is suspended.

After driving of the motor 38, it is checked at step n12, whether of not 0.5 second has elapsed in the case of the high speed driving, while in the case of the low speed driving, it is judged whether or not one second has elapsed at step n16. For the above check, of course, a timer is constituted within the control unit 30 after the detection by the detecting switch 12 (S2), and when this timer has counted 0.5 second or one second, the driving of the motor 38 is suspended (steps n13, n17) so as to stop the transport belt 3. Before the stopping of the transport belt 3 as described above, the original document 11 is stopped at its leading edge by the stopper 2, and after the stopping of the transport belt 3, the original document 11 is stopped as it is located at the predetermined position without fail. When the original document 11 has been stopped at the predetermined position on the original document platform 1, the control unit 30 starts the copying function, and thus, scanning of the original document 11 is carried out for the formation of the image of the original document on the photoreceptor surface. At step n18, it is checked whether or not the scanning of the original document as described above has been completed (in the case of a multi-original document copying, it is checked whether or not the scanning of the set number of original documents has been completed).

When the completion of the original document scanning has been detected, the solenoid 14 is subsequently energized (step n19), and the stopper 2 is released from its orrginal document restricting position. Simultaneously therewith, the motor 38 is also driven (step n20), and the original document 11 on the original document platform 1 is fed in the discharging direction. In this case, the transport belt 3 is driven at the same speed as the speed at which the first original document was transported after setting the original documents. Moreover, the discharging rollers 15 and 16, etc. are also rotated in synchronization with the transport belt 3. During the discharging function of the original document 11, when the trailing edge of this original document is detected by the detecting switch 24 (S3) at step n21, the procedure is shifted to step n22, and after the energization of the solenoid 14 has been suspended (step n22), it is checked whether or not the original documents are present on the tray 7 (step n23). In the above check, if the detecting means 23 (S1) has not detected the original document, the motor 38 is turned off (step n24) to suspend the driving of the transport belt 3, and the procedure reverts to step n2 to wait for original documents to be placed on the original document tray 7.

On the other hand, if the original document has been detected, the procedure is returned to step n7 for feeding a second original document, with the feeding roller 8 being driven again. Thus, by the detection of the leading edge of the original document 11 (step n8), after checking the state of the driving speed for the motor 38 at step n9, driving of the motor 38 is effected. In this case, since the motor 38 is driven during the discharging of the original document and is continuously rotated, the procedure proceeds as in steps n9→n10→n11→n12 at the high speed driving, and the driving of the motor 38 is suspended after 0.5 second from the detection of the original document leading edge (step n13). Meanwhile, in the case of the low speed driving, the procedure proceeds in the order of steps n9→n14→n15→n16, and the motor 38 is stopped (step n17) after one second from the detection of the original document leading edge. By the suspension of the driving of the motor 38 as described above, the second original document 11 is also stopped at the specified position on the original document platform 1. The procedure is thereafter shifted to step n18 to repeat the above functions.

As is clear from the foregoing description, in the original document feeding arrangement according to the present invention, since the original document transporting speed is changed over according to thicknesses of original documents so that a thin original document may be transported at a low speed, breakage of the original document or paper jamming thereby may be advantageously prevented. Furthermore, in the case of a thick original document, it becomes possible to effect a high speed transportation, and thus, exchanging of original documents can be quickly effected for enabling high speed copying.

In the embodiment of the present invention as described so far, although two kinds of original document transporting speeds are provided, with the high driving speed being set to be two times the speed for the low speed driving, this setting is only one example for the simplification of the description, and in the actual practice, settings may be made to such speeds as will not damage the original document when such original document is transported and stopped at the predetermined position. By way of example, if the original documents are thick (e.g., 65 g/m² in weight), the transporting speed by the transport belt 3 is set at 1000 mm/sec, while, when the original documents are thin (e.g., 35 g/m², in weight), the transporting speed thereof by the transport belt 3 is set at 400 mm/sec and thereabout, and thus, the original document transport speed may be suitably set according to the kinds (thicknesses) of the original documents.

Therefore, in the original document feeding arrangement of the present invention, since it is so arranged to provide the means for feeding one sheet of original documents, and for transporting the original document thus fed to the predetermined position on the original document platform to be stopped thereat, original documents may be transported at the highest speeds corresponding to the kinds of the original documents, while damage to the original documents or jamming, etc. may be advantageously prevented. Moreover, depending on the original documents, high speed transportation can be effected for the improvement of the exchangeability of the original documents, thus making it possible to effect copying at high speeds.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as being included therein.

What is claimed is:

1. An original document feeding arrangement for use in a copying machine and the like, which comprises means for feeding original documents placed on a tray, means for transporting the original document thus fed, up to a predetermined position on an original document platform so as to be stopped thereat, means for driving said transporting means, a selecting means for selecting speeds of said transporting means according to kinds of the original documents, and a control means for effecting speed control of said driving means at the speed selected by said selecting means.

2. An original document feeding arrangement as claimed in claim 1, wherein said original document transporting means further includes a detecting means for detecting presence or absence of the original documents on said tray so as to drive an original document feeding roller through operation of a copy start switch upon detection of the presence of the original document thereby.

3. An original document feeding arrangement as claimed in claim 1, wherein said original document transporting means further includes another detecting means for detecting a leading edge of the original document being fed so as to drive a transport belt thereof.

4. An original document feeding arrangement as claimed in claim 1, further including an original document discharging means provided with a detecting means for detecting a trailing edge of the original document so as to drive an original document feeding roller for a subsequent original document feeding when the presence of the original documents has been detected by an original document presence/absence detecting means.

5. An original document feeding arrangement as claimed in claim 1, wherein said original document transporting means includes a stopper member provided at one side of the original document platform for contact with the leading edge of the original document transported through between a transport belt of said original document transporting means and said original document platform.

6. An original document feeding arrangement as claimed in claim 5, wherein said stopper member is pivotally supported at its one end and normally positioned so as to contact the leading edge of the original document at the other end thereof, with a solenoid means being connected to the stopper member so as to displace said stopper member to a position out of contact with said leading edge when energized by a signal representing termination of optical scanning.

7. An original document feeding arrangement as claimed in claim 1, wherein said control means includes a micro-computer having a read only memory, a random access memory, and a central processing unit.

* * * * *